United States Patent [19]

Noll

[11] Patent Number: 5,544,334
[45] Date of Patent: Aug. 6, 1996

[54] MICRO CHANNEL BUS COMPUTER SYSTEM WITH IDE HARD DRIVE INTERFACE

[75] Inventor: Mark G. Noll, Lake Worth, Fla.

[73] Assignee: International Business Machines Corporation, Armonk, N.Y.

[21] Appl. No.: 172,124

[22] Filed: Dec. 22, 1993

[51] Int. Cl.⁶ .............................. G06F 3/00; G06F 13/00
[52] U.S. Cl. ..................... 395/309; 395/500; 395/420; 395/306; 395/280; 364/240
[58] Field of Search ................................. 395/500, 325, 395/425, 309, 420, 306, 280; 365/230; 364/200, 228, 229; 307/465

[56] References Cited

U.S. PATENT DOCUMENTS

| | | | |
|---|---|---|---|
| 4,368,515 | 5/1981 | Nielsen | 364/200 |
| 4,388,707 | 6/1981 | Komatsu et al. | 365/230 |
| 4,503,491 | 3/1985 | Lushtak et al. | 364/200 |
| 4,991,085 | 4/1988 | Pleva et al. | 364/200 |
| 5,038,320 | 8/1991 | Heath et al. | 364/900 |
| 5,043,877 | 8/1991 | Berger et al. | 364/200 |
| 5,129,036 | 7/1992 | Dean et al. | 395/2 |
| 5,133,060 | 7/1992 | Weber et al. | 395/475 |
| 5,162,675 | 11/1992 | Olsen et al. | 307/465 |
| 5,187,781 | 7/1992 | Heath | 395/325 |
| 5,191,657 | 3/1993 | Ludwig et al. | 395/325 |
| 5,218,686 | 6/1993 | Thayer | 395/425 |
| 5,233,594 | 8/1993 | Wilhelm | 369/75.1 |
| 5,241,546 | 8/1993 | Peterson et al. | 371/37.1 |
| 5,243,495 | 9/1993 | Read et al. | 361/685 |
| 5,263,141 | 4/1993 | Sawaki | 395/425 |
| 5,295,247 | 3/1994 | Chang et al. | 395/325 |
| 5,329,634 | 7/1994 | Thompson | 395/500 |
| 5,379,403 | 1/1995 | Turvy | 395/500 |

FOREIGN PATENT DOCUMENTS

0545675A1  6/1993  European Pat. Off. .

OTHER PUBLICATIONS

Disk–Drive Controllers Automate Data Flow, Electron. Des., vol. 40, No. 20, pp. 79–80, 82, 85; Oct. 1, 1992.
ALR's Multiprocessing Monster Uses Six i486 Processors, BYTE, vol. 16, No. 4, pp. 279–282, Apr. 1991.
The IDE Hard Disk Drive Interface, BYTE, vol. 16, No. 3, pp. 317–322, 344, Mar. 1991.
New Controller Makes SCSI Palatable to PCs, BYTE, vol. 15, No. 12, pp. 205–206,208, Nov. 1990.
Join the EISA Evolution, BYTE, vol. 15, No. 5, pp. 241–244, 246–247, May 1990.

*Primary Examiner*—Thomas C. Lee
*Assistant Examiner*—Greta Robinson
*Attorney, Agent, or Firm*—Sean T. Moorhead; Calfee, Halter & Griswold

[57] ABSTRACT

A computer system having: a central processing unit (CPU), having a system bus associated therewith, a first bus interface circuit (BIC) in circuit communication with the CPU and generating a peripheral bus, such as the MICRO CHANNEL bus, a floppy drive controller (FDC), and an Integrated Drive Electronics (IDE) hardfile (hard drive). The IDE hardfile is in electrical circuit communication with the peripheral bus via a second bus interface circuit. The second bus interface circuit includes a writable latch having at least two states and in circuit communication with the peripheral bus. The latch states are selectable by the CPU via the system bus. The second bus interface circuit also has an access control circuit in circuit communication with the peripheral bus, the system bus, and the latch for selectively allowing data transfers between the CPU and either the FDC or the IDE hard drive, depending on the state of the latch.

16 Claims, 14 Drawing Sheets

MICRO CHANNEL BUS COMPUTER SYSTEM WITH IDE HARD DRIVE INTERFACE

FIELD OF THE INVENTION

The present invention relates generally to computer system architecture and, more specifically, to a computer system based on the MICRO CHANNEL Architecture having an interface capable of using an Integrated Drive Electronics (IDE) hard drive.

BACKGROUND OF THE INVENTION

Personal computer systems are well known in the art. Personal computer systems in general, and IBM Personal Computers in particular, have attained widespread use for providing computer power to many segments of today's modern society. Personal computers can typically be defined as a desktop, floor standing, or portable microcomputer that is comprised of a system unit having a single central processing unit (CPU) and associated volatile and non-volatile memory, including all RAM and BIOS ROM, a system monitor, a keyboard, one or more flexible diskette drives, a fixed disk storage drive (also known as a "hard drive"), a so-called "mouse" pointing device, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are IBM's PERSONAL COMPUTER AT (hereinafter IBM PC/AT), IBM's PERSONAL SYSTEM/1 (IBM PS/1), and IBM's PERSONAL SYSTEM/2 (IBM PS/2).

These systems can be classified into two general families. The first family, usually referred to as Family I Models, use the well known industry standard architecture (ISA) bus architecture exemplified by the IBM PC/AT and the IBM PS/1 and also used by so-called "IBM compatible" machines. The second family, referred to as Family II Models, use IBM's well known MICRO CHANNEL bus exemplified by IBM's PS/2.

Personal computer systems are typically used to execute software to perform such diverse activities as word processing, manipulation of data viaspread-sheets, collection and relation of data in databases, displays of graphics, design of electrical or mechanical systems using system-design software, etc.

In such computer systems, the components communicate via electrical signals. These electrical signals are typically carried by electrical connections between the system components. Typical types of electrical connections include metal traces on a printed circuit board (PCB), vias between different levels of multilayer PCBs, plated through holes, plugs, and individual wires connected from pin to pin of system components. Typically groups of electrical signals and groups of electrical connections which carry the electrical signals are referred to as a "bus." Thus, a reference to a "bus" can indicate a reference to a group of electrical signals, a group of electrical connections which carry the electrical signals, or a reference to both a group of electrical signals which form a protocol and a group of electrical connections which carry the electrical signals. Buses are made up of "bus lines." A reference to an individual "bus line" may refer to an electrical connection of a bus or an electrical signal of a bus.

The MICRO CHANNEL bus is a well known bus, which is fully described in *IBM Personal System/2 Hardware Interface Technical Reference*, which is available to the public from International Business Machines Corporation. MICRO CHANNEL bus systems are typically higher end systems than ISA systems. The MICRO CHANNEL bus has a higher bus bandwidth than the ISA bus. In addition, the MICRO CHANNEL bus has an optional streaming data procedure that provides a faster data transfer rate than the basic transfer procedure and allows 64-bit data transfers. Moreover, the MICRO CHANNEL bus provides an arbitration procedure that allows the system master and up to 15 devices to bid for control of the MICRO CHANNEL bus.

Fixed disk storage devices (hard drives) are typically connected either directly to the system planar or interface to the system planar through a peripheral adapter card. Hard drives are sold with various interface configurations, such as the older analog MFM (modified frequency modulation) and RLL (run-length limited) interfaces and the newer, very popular digital IDE (integrated drive electronics) and SCSI (small computer system interface) interfaces.

The IDE AT interface is an extension of the IBM PC/AT bus and was designed specifically to be easily interfaced to IBM PC/AT systems and other ISA systems. The AT IDE interface is a well known bus, which is fully described in the draft American National Standards Institute (ANSI) specification number X3.221 entitled "AT Attachment Interface for Hard Drives," which is available from Global Engineering, 2805 McGraw St., Irvine, Calif. 92714.

The SCSI bus, on the other hand, was designed to be used in a variety of systems. For example, interface cards exist to interface a SCSI drive to an ISA-based machine through the ISA bus, to MICRO CHANNEL bus-based systems through the MICRO CHANNEL bus, and to Video Electronics Standards Association (VESA) Local Bus-based systems through the VESA Local Bus.

Until relatively recently, SCSI drives were the only drives available for use with personal computer systems that had both high densities and fast access times. Therefore, until relatively recently, the higher end systems, such as all MICRO CHANNEL bus-based systems, used SCSI drives exclusively. However, quite recently, IDE drives have achieved similar densities, at similar access times. Moreover, IDE drives are typically cheaper and physically smaller than SCSI drives of corresponding fixed disk capacity.

Therefore, it is desirable to be able to connect an IDE hard drive to a MICRO CHANNEL bus-based system to take advantage of the smaller size and lower price for drives with comparable storage capacities and access times. However, the MICRO CHANNEL bus is very different from the ISA bus. Because the IDE interface is directly derived from the ISA bus, IDE hard drives are not able to be directly connected to the MICRO CHANNEL bus.

However, connection of an IDE drive to a MICRO CHANNEL bus system involves several problems. First, the IDE drive address space overlaps with the address space for the floppy drive controller (FDC). For reasons of portability and compatibility, devices in computer systems typically access fixed addresses in I/O space. The FDC uses the I/O port address range 03F0H to 03F7H. Typical FDCs do not use address 03F6H; rather most typical FDCs designate address 03F6H as an address "reserved" for future use. An IDE interface device uses the I/O port address ranges 01F0H to 01F7H and 03F6H to 03F7H. It is readily apparent that in a system with both an IDE drive and a FDC, both the IDE drive and FDC would respond simultaneously to I/O accesses to location 03F7H. Moreover, control words sent to one would be received by both, possibly causing data loss and/or total system failure.

Second, the timing of data transfer cycles on the MICRO CHANNEL bus is different from that of the IDE interface. On the IDE interface, the IORDY signal is pulled low to extend a data transfer cycle after the DIOR- or DIOW- signal goes active. In contrast, on a MICRO CHANNEL bus, CD CHRDY must be pulled low to extend a data transfer cycle before CMD- goes active.

Third, the MICRO CHANNEL bus and the IDE interface are designed to handle data transfer cycles of different cycle times. The MICRO CHANNEL bus has three different cycle times: 200 ns (default synchronous cycle), 300 ns (synchronous extended cycle), and >300 ns (asynchronous extended cycle). The IDE interface has three different cycle times: 600 ns (Mode 0), 383 ns (Mode 1), and 240 ns (Mode 2). Thus, the shortest data transfer cycle between a Mode 2 capable IDE drive and the MICRO CHANNEL bus is a 300 ns synchronous extended cycle. That is, only Mode 2 devices can make use of a synchronous cycle. Mode 0 and Mode 1 devices must use the asynchronous extended cycle.

Fourth, the polarity of the reset signals are inverted. On the IDE interface, the RESET signal is active low. On the MICRO CHANNEL bus, the CHRESET signal is generally active high.

Fifth, the IDE interface interrupt INTRQ is not a sharable interrupt. However, the hard file interrupt on the MICRO CHANNEL bus, —IRQ 14, is a sharable interrupt. Thus, numerous obstacles exist to connecting an IDE hard drive to the MICRO CHANNEL bus.

In addition, when the MICRO CHANNEL bus is accessed in a MICRO CHANNEL bus environment, —CD SFD-BK(n) and —CD DS 16(n) must be correctly driven by the device accessing the MICRO CHANNEL bus.

SUMMARY OF THE INVENTION

According to the present invention, a computer system is provided having a CPU having an associated system bus, a MICRO CHANNEL bus interface circuit, which generates a MICRO CHANNEL bus from the system bus, a floppy drive controller, which interfaces to a floppy drive, and an IDE hard drive. The IDE hard drive is interfaced to the MICRO CHANNEL bus via a custom MICRO CHANNEL Architecture (MCA) to IDE bus interface circuit (MCA to IDE BIC).

The MCA to IDE BIC has a writable latch in circuit communication with the MICRO CHANNEL bus that has at least two states. The latch states are selectable by the CPU via the system bus. The MCA to IDE BIC also has an access control circuit in circuit communication with the MICRO CHANNEL bus, the system bus, and the latch for selectively allowing data transfers between the CPU and either the FDC or the IDE hard drive, depending on the state of the latch.

The address space conflict between the FDC and the IDE hard drive is handled by providing the floppy drive controller (FDC) and the MCA to IDE BIC with an access enable/disable circuit to control accesses to addresses 03F6H and 03F7H. The MCA to IDE BIC provides a command latch that controls whether either, both, or neither of the two addresses are active. When an address is active, data accesses are passed to the IDE interface. When an address is not active, the accesses are not passed to the IDE interface. Likewise, other circuitry provides the FDC with similar access control.

With respect to the IDE hardfile, addresses 03F6H and 03F7H are accessed only to accomplish system-type tasks such as generating a "soft" reset of the IDE drive, or enabling or disabling the hardfile interrupt, or reading the status of the hardfile without clearing a pending interrupt, or for reading diagnostic information from the hardfile. As such, they are accessed seldomly. Moreover, typically, only the system BIOS accesses the diagnostic features of the hard drive. Thus, as long as the system BIOS (or other software accessing the overlapping addresses) is modified to make use of the command latch when accessing the diagnostic addresses, the IDE interface may be used with the floppy drive controller.

The sharable/nonsharable interrupt problem is handled by making the IDE interrupt, INTRQ, sharable. INTRQ is connected in a wired —OR configuration to —INT 14 on the MICRO CHANNEL bus. An extra readable bit is provided to allow devices on the system to determine if the IDE interface was the cause of the —IRQ 14 interrupt. These two changes allow the IDE to share —INT 14 with other devices on the MICRO CHANNEL bus.

It is therefore an advantage of the present invention to provide a MCA to IDE BIC to allow an IDE hard drive to be used in MICRO CHANNEL bus systems.

It is a further advantage of this invention to provide control circuitry for and method of allowing devices to share what would otherwise be conflicting address spaces.

These and other advantages of the present invention shall become more apparent from a detailed description of the invention.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below serve to example the principles of this invention.

DETAILED DESCRIPTION OF THE PREFERRED EMBODIMENT

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
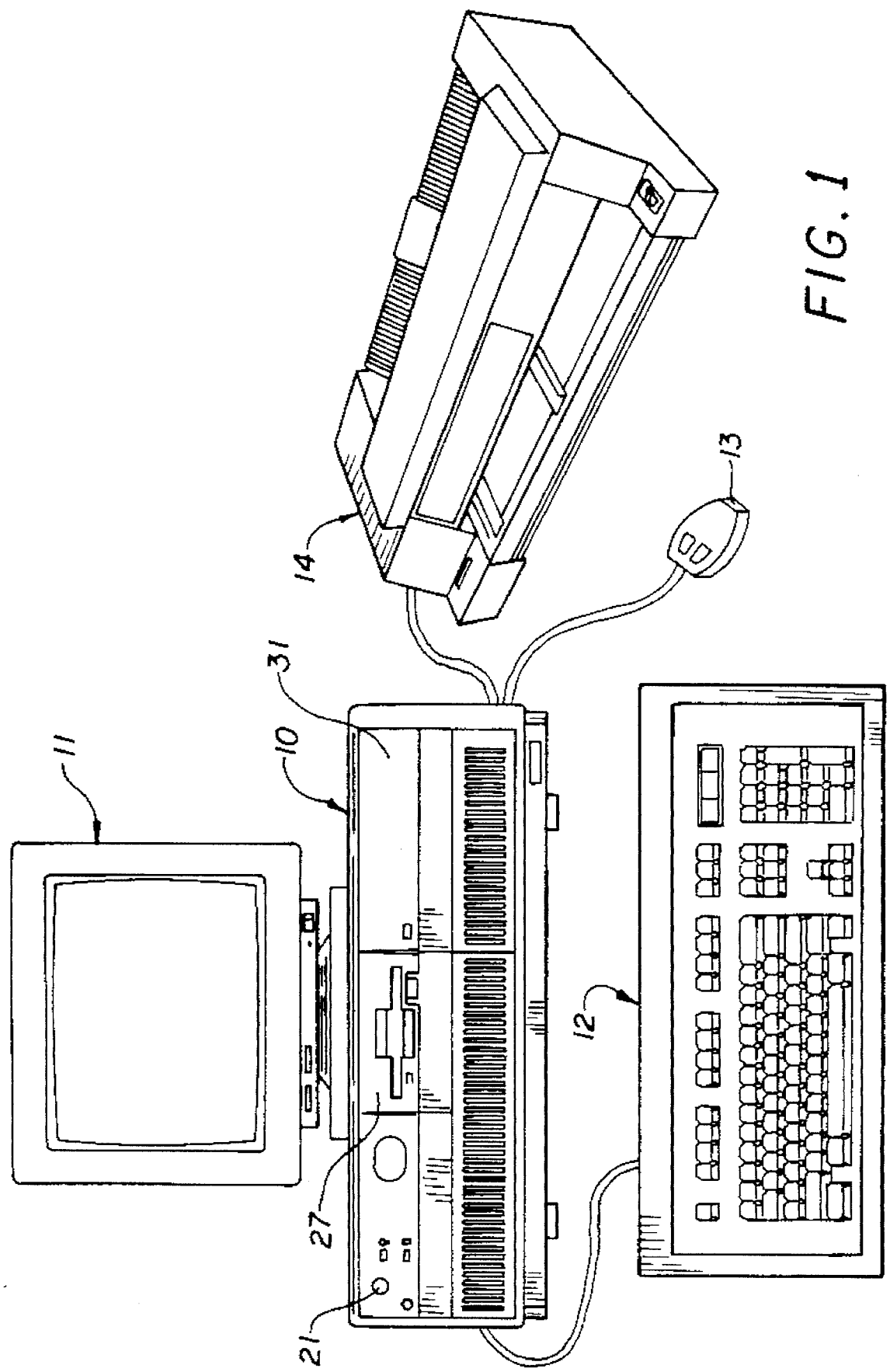
FIG. 1 is a perspective view of a personal computer embodying this invention.

Referring now more particularly to the accompanying drawings, a microcomputer system embodying the present invention is there shown and generally indicated at 10 (FIG. 1). The computer system 10 may have an associated monitor 11, keyboard 12, mouse 13, and printer or plotter 14. The computer system 10 has a cover 15 formed by a decorative outer member 16 (FIG. 2) and an inner shield member 18 which cooperate with a chassis 19 in defining an enclosed, shielded volume for receiving electrically powered data processing and storage components for processing and storing digital data. At least certain of these components are mounted on a multilayer planar or motherboard 20 which is mounted on the chassis 19 and provides a medium for electrically interconnecting the components of the computer 10 including those identified above and such other associated elements as floppy disk drives, various forms of direct access storage devices, accessory cards or boards, and the like. As pointed out more fully hereinafter, provisions are made in the planar 20 for the passage of input/output signals to and from the operating components of the microcomputer.

As mentioned hereinabove, the computer has a cover indicated generally at 15 (FIG. 2) which cooperates with the chassis 19 in forming an enclosed, shielded volume for containing the above identified components of the microcomputer. The cover 15 preferably is formed with an outer decorative cover member 16 which is a unitary molded component made of a moldable synthetic material and a metallic thin sheet liner 18 formed to conform to the configuration of the decorative cover member. However, the cover can be made in other known ways and the utility of this invention is not limited to enclosures of the type described.

Figure 2:
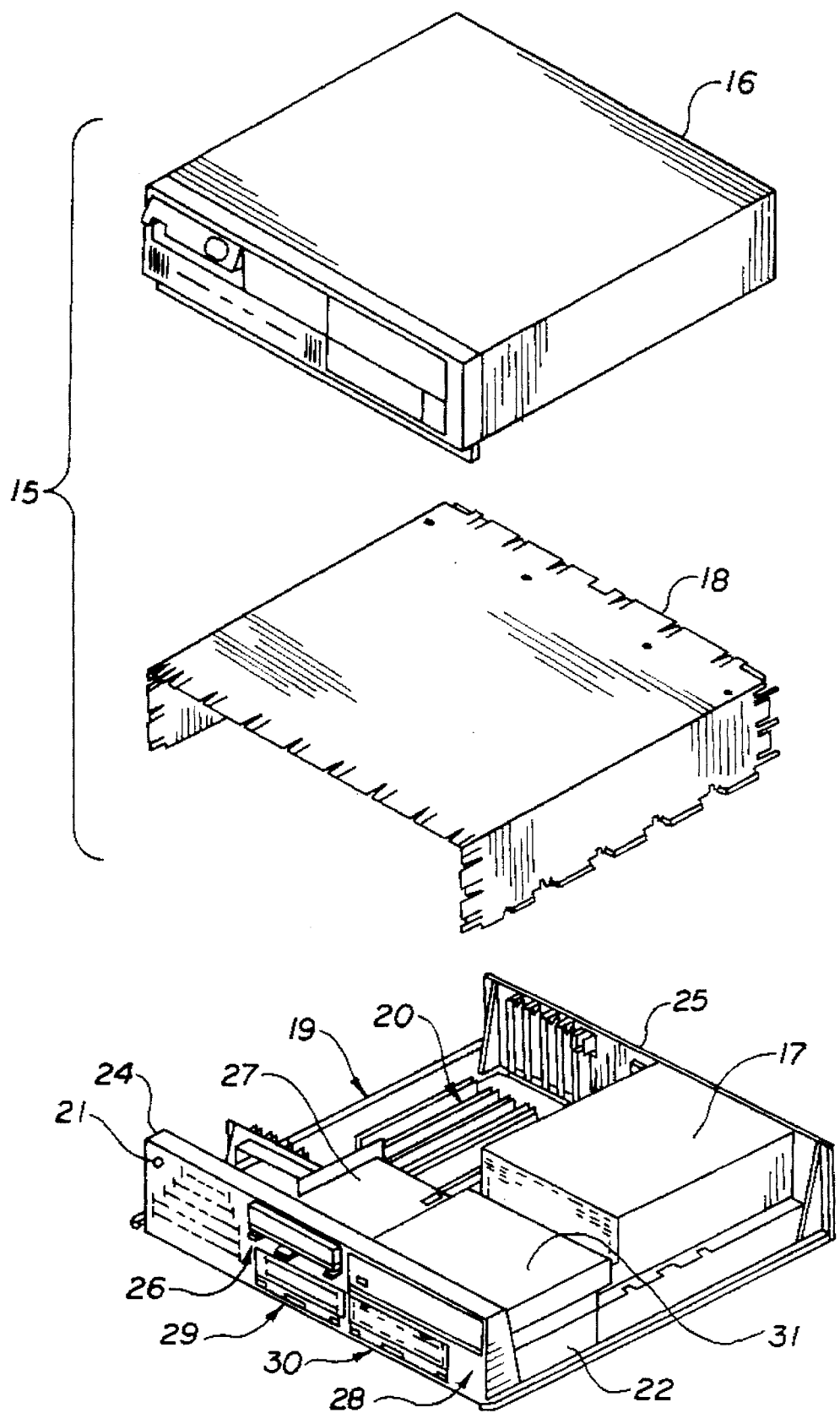
FIG. 2 is an exploded perspective view of certain elements of the personal computer of FIG. 1 including a chassis, a cover, an electromechanical direct access storage device and a planar board and illustrating certain relationships among those elements.

The computer system has a power supply 17 and a power switch 21 for switching unregulated line power to and from the power supply 17. The chassis 19 has a base indicated at 22, a front panel indicated at 24, and a rear panel indicated at 25 (FIG. 2). The front panel 24 defines at least one open bay (and in the form illustrated, four bays) for receiving a data storage device such as a disk drive for magnetic or optical disks, a tape backup drive, or the like. In the illustrated form, a pair of upper bays 26, 28 and a pair of lower bays 29, 30 are provided. One of the upper bays 26 is adapted to receive peripheral drives of a first size (such as those known as 3.5 inch drives) while the other 28 is adapted to receive drives of a selected one of two sizes (such as 3.5 and 5.25 inch) and the lower bays are adapted to receive devices of only one size (3.5 inch). One floppy disk drive is indicated at 27 in FIG. 1, and is a removable medium direct access storage device capable of receiving a diskette inserted thereinto and using the diskette to receive, store and deliver data as is generally known. One IDE hard disk drive is indicated at 31 and is a fixed medium direct access storage device capable of storing and delivering data as is generally known.

Figure 3:
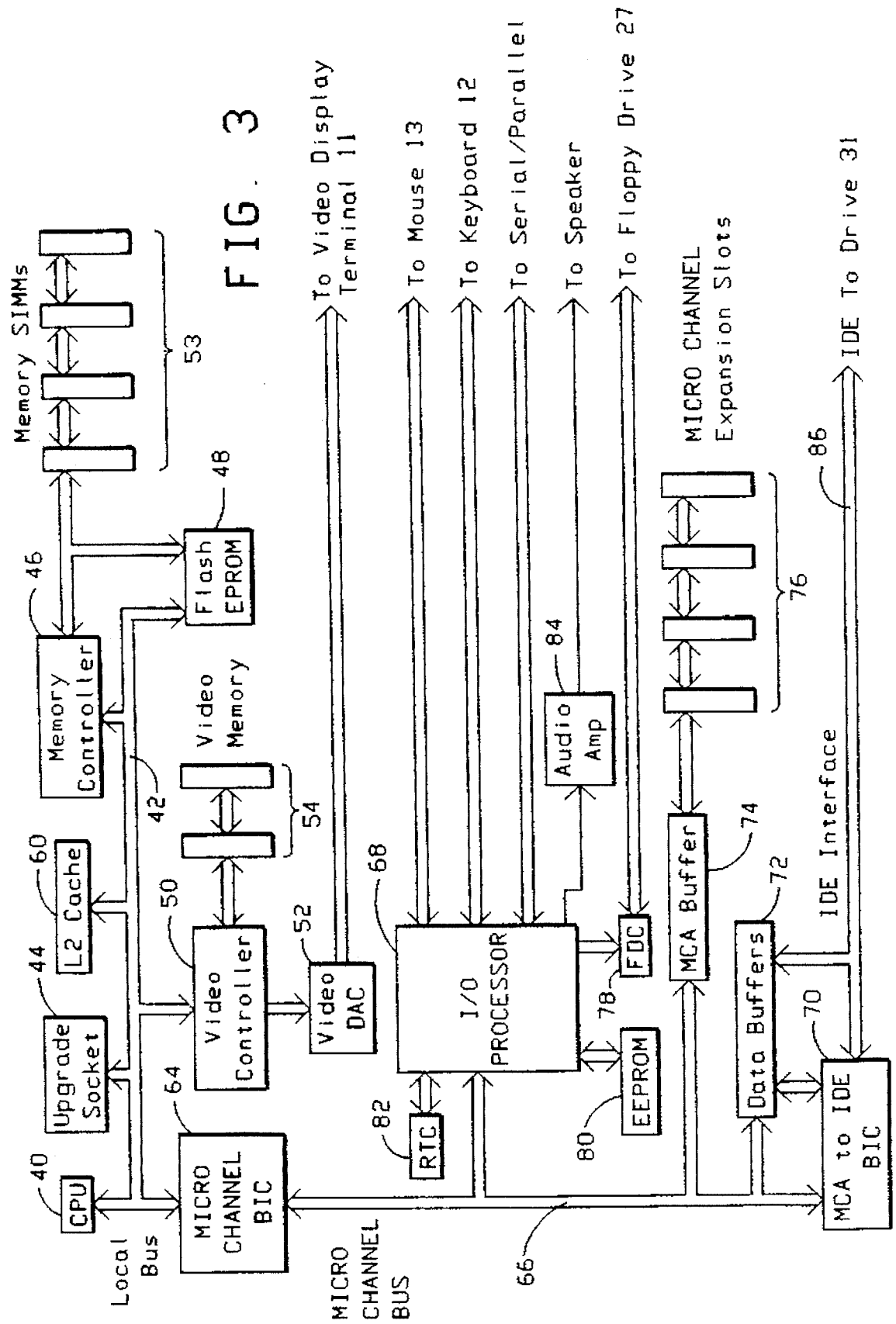
FIG. 3 is a block diagram of certain components of the personal computer of FIGS. 1 and 2.

Prior to relating the above structure to the present invention, a summary of the operation in general of the personal computer system 10 may merit review. Referring to FIG. 3, there is shown a block diagram of a personal computer system illustrating the various components of the computer system 10 in accordance with the present invention, including components mounted on the planar 20 and the connection of the planar to the I/O slots and other hardware of the personal computer system. Connected to the planar is the system processor or CPU 40, which is connected by a high speed CPU local bus 42 through a memory controller 46, which is further connected to a volatile random access memory (RAM) 53. The RAM 53 comprises four 16 megabyte error correction code (ECC) single in-line memory modules (SIMMs). The memory controller 46 includes the logic for mapping addresses to and from the CPU 40 to particular areas of RAM 53. This logic is also used to reclaim RAM previously occupied by the BIOS ROM 48. The BIOS ROM 48 is Flash EPROM.

While any appropriate microprocessor can be used for system processor 40, one suitable microprocessor is the 80486 which is sold by INTEL. The Intel 80486 has an internal cache (not shown), therefore, any CPU 40 that is an Intel 80486 will have a CPU cache.

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. For example, the system processor 40 could be an Intel 80286 or 80386 microprocessor. As used herein, reference to an 80286 or 80386 or 80486 generally intends such a microprocessor as obtained from Intel. However, in recent times other manufacturers have developed microprocessors that are capable of executing the instruction set of the Intel X86 architecture, and usage of the terms stated is intended to encompass any microprocessor capable of executing the relevant portion of that instruction set. As known to persons skilled in the applicable arts, early personal computers typically used the then popular Intel 8088 or 8086 microprocessor as the system processor. These processors have the ability to address one megabyte of memory. More recently, personal computers typically use the high speed Intel 80286, 80386, and 80486 microprocessors which can operate in a virtual or real mode to emulate the slower speed 8086 microprocessor or a protected mode which extends the addressing range from 1 megabyte to 4 gigabytes for some models. In essence, the real mode feature of the 80286, 80386, and 80486 processors provide hardware compatibility with software written for the 8086 and 8088 microprocessors. Processors in the Intel family described are frequently identified by a three digit reference to only the last three digits of the full type designator, as "486".

Returning again to FIG. 3, the CPU local bus 42 (comprising data, address and control components) provides for the connection of the CPU 40, an upgrade socket 44, a video controller 50, a system cache memory 60. The upgrade socket may be used to upgrade the system 10 with either a mathematical coprocessor or a second CPU also known as a "doubler chip" to enhance system performance.

The video controller 50 has associated with it a video digital to analog controller (DAC) 52 and a video memory 54. Also coupled on the CPU local bus 42 is a MICRO CHANNEL Architecture bus interface circuit (MCA BIC) 64. The MCA BIC 64 is itself connected to a slower speed (compared to the CPU local bus 42) MICRO CHANNEL bus 66, also comprising address, data and control components. The MICRO CHANNEL bus 66 extends between the MCA BIC 64 and an I/O Processor 68, an MCA to IDE bus interface circuit (MCA to IDE BIC) 70, and data buffers 72. The MICRO CHANNEL bus 66 is further connected to an MCA buffer 74. The MCA buffer 74 extends the MICRO CHANNEL bus 66 to a plurality of I/O slots 76 for receiving MCA adapter cards (not shown). MCA adapter cards are pluggably connected to the I/O slots 76 and may provide additional I/O devices or memory for the system 10.

Coupled to the I/O processor 68 are a variety of I/O adapters and other components such as floppy drive controller (FDC) 78, nonvolatile electrically erasable and programmable read only memory (EEPROM) 80, a CMOS real-time clock (RTC) 82, and an audio amplifier 84.

The FDC 78 controls the floppy drive 27. In typical computer systems, the floppy drive controller 78 does not have an enable function to enable or disable accesses to the address range of the FDC. However, such an enable must be added to the FDC 78 to prevent conflict over the overlapping addresses. In the present invention, during normal use, the floppy drive controller 78 is enabled and has access to the I/O ports within the floppy drive 27 at address 03F7H. When accessing the I/O ports at address 03F7H within the IDE drive 31, access to this address in the FDC address space must be disabled to avoid conflict. The enable can be designed into the FDC 78 itself or into the I/O processor 68. The enable is more fully described in the text accompanying FIGS. 5A to 5I.

The I/O processor 68 comprises circuitry to generate signals that are generated by discrete devices in many prior art computer systems. The I/O processor 68 comprises: an interrupt controller, a pair of RS-232 adapters, a parallel port adapter, a plurality of timers, a mouse coprocessor, a keyboard coprocessor, and other necessary circuitry, as is well known in the art.

The read only memory 48 includes the BIOS that is used to interface between the I/O devices and the operating system of the microprocessor 40. BIOS stored in ROM 48 can be copied into RAM 53 to decrease the execution time of BIOS.

The EEPROM 80 contains values which describe the present configuration of the system. For example, the EEPROM 80 contains information describing the capacity of a fixed disk or diskette, the type of display, the amount of memory, time, date, etc.

The MCA to IDE BIC 70 and the data buffers 72 will be described more fully in the text accompanying FIGS. 5A to 5I. Suffice it for now to say that these structures interface between the MICRO CHANNEL bus 66 and an IDE interface 86 that connects to the IDE hard drive 31.

Figure 4A:
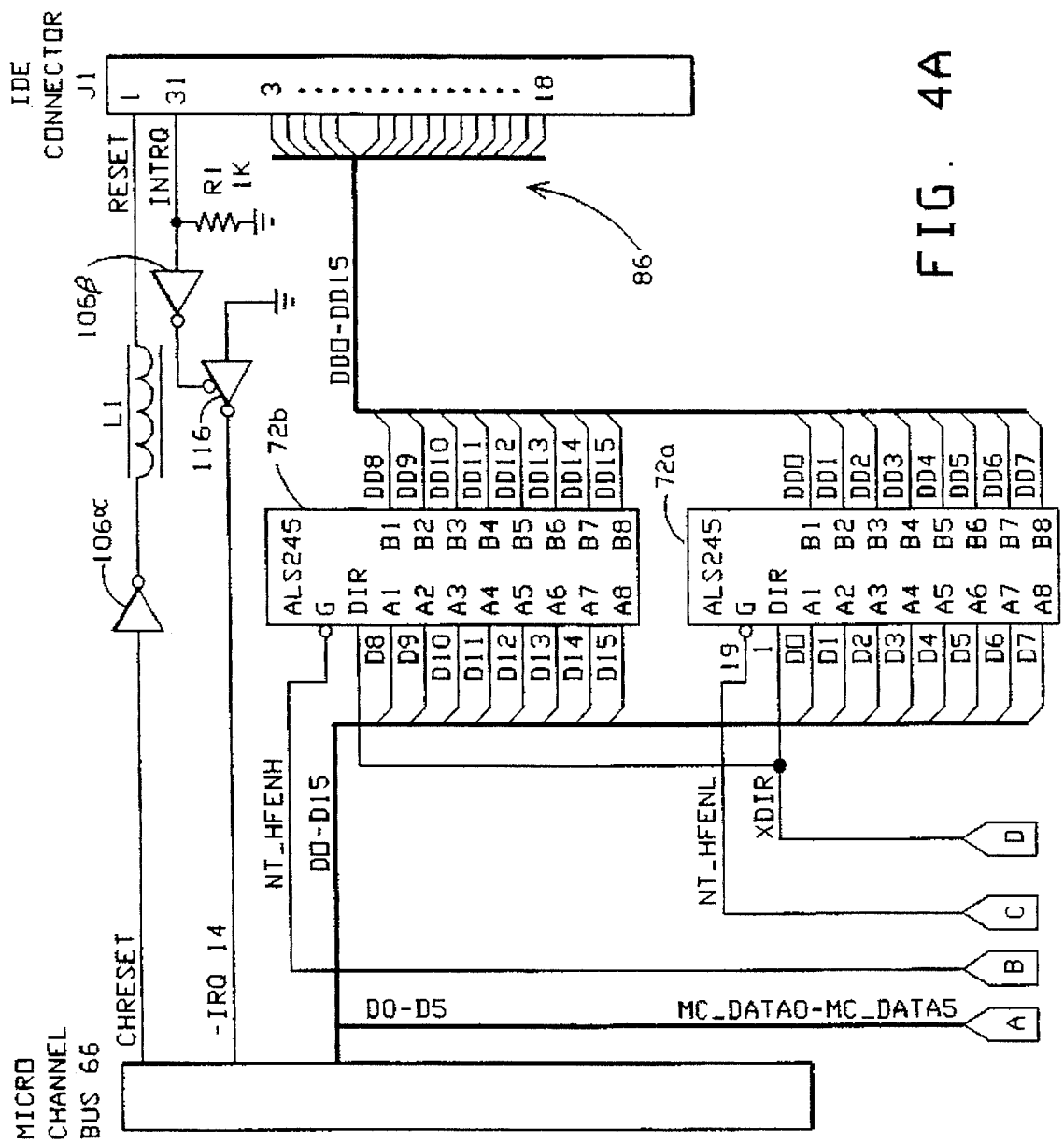
FIGS. 4A and 4B are electrical schematic diagrams showing the connections between the MICRO CHANNEL bus, the IDE interface, and the MCA to IDE bus interface circuit of the present invention.
Figure 4B:
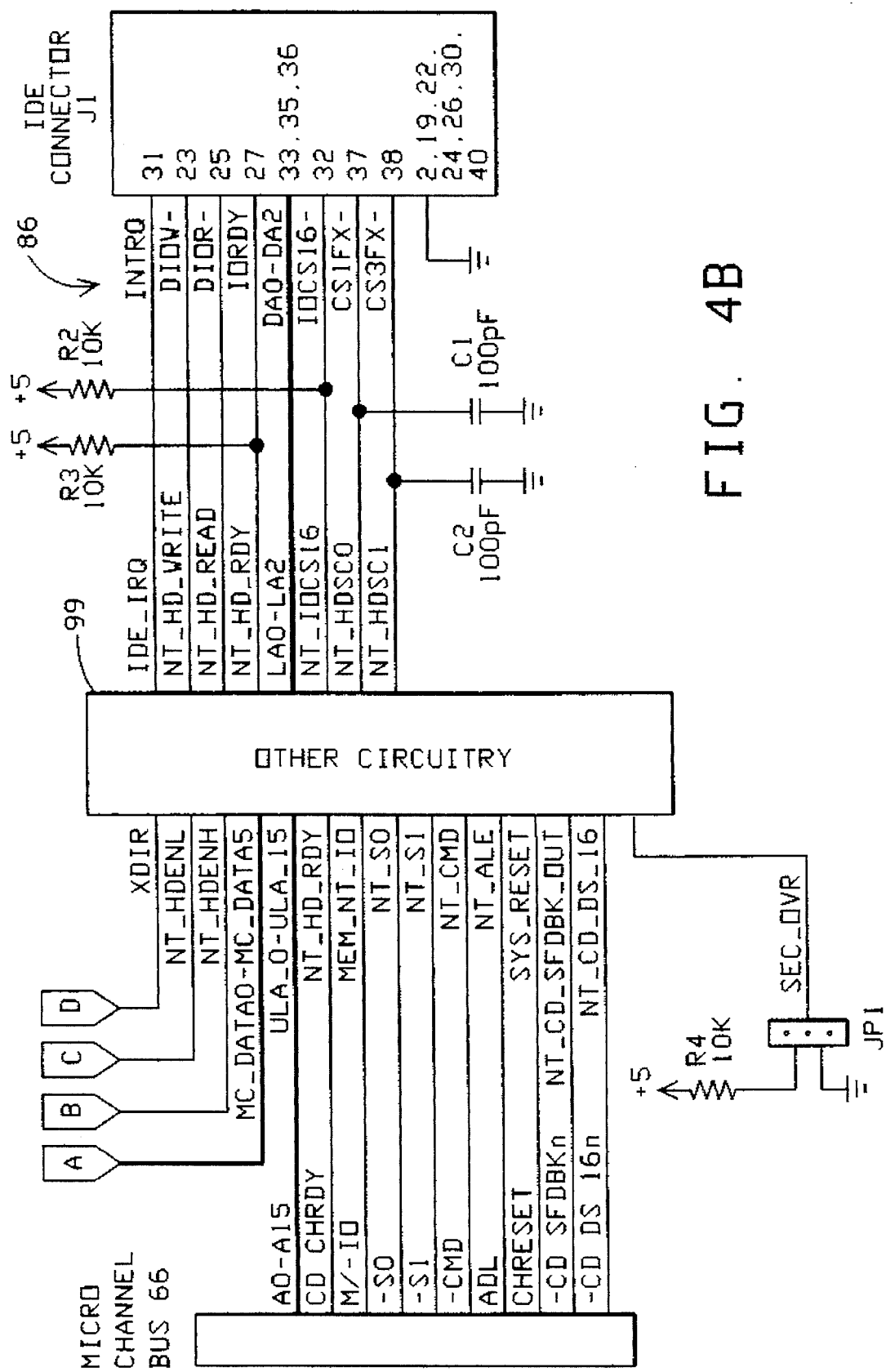

Referring now to FIGS. 4A and 4B, the connection details of the MICRO CHANNEL bus, MCA to IDE BIC 70, IDE interface 86, and data buffers 72 are shown.

FIG. 4A shows the connections between the IDE interface 86, the MCA to IDE BIC 70, the data buffers 72, the MICRO CHANNEL bus 66, and certain miscellaneous discrete components. In addition to data and address lines, eight of the well-known IDE interface lines must be generated/manipulated to interface an IDE drive to the MICRO CHANNEL bus: CS1FX—, CS3FX—, DIOR—, DIOW—, IOCS16—, IORDY, INTRQ, and RESET—, where the "—" indicates an active low signal. The MCA to IDE BIC 70 manipulates certain MICRO CHANNEL bus lines, as shown in FIGS. 4A and 4B, to generate the above eight IDE interface lines.

The IDE interface 86 connects to the system planar 20 via connector J1. Connector J1 is a 2 by 20 BERG connector, as is well known in the art. The other circuitry 99 shown in FIG. 4B corresponds to the remaining circuitry of the MCA to IDE BIC 70. The lines connecting to the other circuitry 99, as labeled in FIGS. 4A and 4B, correspond to the lines and labels used in FIGS. 5A to 5I, which show the remaining internal details of the MCA to IDE BIC 70.

The data bus of the MICRO CHANNEL bus is interfaced to the IDE data bus via two 74ALS245 bidirectional buffers 72. The data buffers 72 comprise two 74ALS245 buffers 72a and 72b, which are well known in the art and are electrically connected as shown in FIG. 4A to connector J1, the MCA to IDE BIC 70, and the MICRO CHANNEL bus 66.

The discrete components-inductor L1, resistors R1, R2, & R3, and capacitors C1 & C2—are all connected as shown in FIGS. 4A and 4B. Inductor L1 is used to minimize ringing and glitches on the IDE RESET line. Resistors R3 and R2 are 10 KΩ 5% 0.0833 watt pullup resistors used to pull their respective lines up to a logical ONE. Resistor R1 is a 1 KΩ 5% 0.0833 watt resistor that is used to pull the IDE_IRQ line to a known state. These three lines are outputs from the IDE drive and inputs to the MCA to IDE BIC 70. In certain circumstances, an IDE hardfile may not always be connected to the system 10. As such, resistors R1–R3 ensure that the MCA to IDE BIC 70 does not receive floating signals in the unlikely event that the hardfile is removed. Capacitors C1 and C2 are 100 pF 10% ceramic capacitors used to prevent certain EMC problems.

The MCA to IDE BIC 70 comprises the circuitry shown in FIGS. 4A and 4B and 5A to 5I. Specifically, the MCA to IDE BIC comprises address decode logic 100, separate level sensitive scan design (LSSD) latches 102, LSSD latches with common clocks 104, inverters 106, simple combinatorial logic blocks 108, complex combinatorial logic blocks 110, an LSSD latch with ANDed inputs 112, additional separate LSSD latches 114, a tristate inverting buffer 116, a simple multiplexer 118, several DELAYs 120a–120c, and a tristate read multiplexer 122, in electrical circuit communication, as shown in FIGS. 4A, 4B, and 5A to 5I.

Logical inverters 106α, 106β, and 106a–106o are common logic inverters, as are well known in the art. Simple logic blocks 108a–108hh comprise AND, NAND, OR, NOR, and XNOR gates, as are well known in the art. Complex logic blocks 110a–110m are self explanatory. For example, complex logic blocks 110a and 110a are 3×2 OR-AND complexes, comprising two (2) three- (3-) input OR gates, with the outputs of the OR gates ANDed together to form the output O. Likewise, complex logic block 110h is a 4-2 AND complex, comprising four (4) two- (2-) input AND gates, as shown. As a final example, complex logic block 110l is a 2×3 AND-OR-INVERT complex, comprising three (3) two- (2-) input AND gates, with the inputs of the AND gates Ored together and inverted to form the output O.

Referring once again to FIG. 4A, the details of the reset and IDE interrupt are shown. Inverter 106α inverts the CHRESET signal from the MICRO CHANNEL bus and outputs a signal to the RESET line of the IDE bus. In the alternative, the RESET line of the IDE bus can be pulled to a logical ONE using a 10K ohm resistor (not shown). In that case, the CPU 40 resets the IDE drive with a "soft" reset using the IDE drive control registers.

The IDE interrupt circuitry is also shown in FIG. 4A. Recall that the IDE interface interrupt INTRQ is not a sharable interrupt. However, the hard file interrupt on the MICRO CHANNEL bus, —IRQ 14, is a sharable interrupt. The MCA to IDE BIC 70 corrects this inconsistency by coupling the INTRQ line to the —IRQ 14 line with a tristate buffer and providing a readable I/O port to detect if the IDE drive 31 is generating an —IRQ 14 interrupt.

INTRQ is connected to —IRQ 14 with inverter 106β and a tristate driver 116, connected as shown in FIG. 4A. Thus, when INTRQ is inactive, buffer 116 is in a tristate mode and the —IRQ 14 line is virtually unaffected. On the other hand, when INTRQ is active, —IRQ 14 is pulled to a logical ZERO generating an interrupt to be handled by the interrupt controller within the I/O processor 68. INTRQ is further connected to the system via an I/O port; the —INT 14 interrupt service routine determines if INTRQ generated the —INT 14 interrupt by reading that I/O port. The details of the I/O port are described in the text accompanying FIG. 5I.

FIG. 4B shows the connector labels corresponding to the labels used in FIGS. 5A to 5I, which show the remaining internal details of the MCA to IDE BIC 70. For example, in FIG. 4B, the internal label "NT_CMD" is shown to correspond to the MICRO CHANNEL bus "—CMD" signal. In this example, FIGS. 5A to 5I are labeled with only NT_CMD and CMD (NT_CMD negated by inverter 106e) labels, not —CMD.

The security override signal is multiplexed to provide a way of reading the state of the INTRQ line of the IDE interface. As shown in FIG. 4B, the security override SEC_OVR line is implemented with a two position jumper JP1 that connects the security I/O port either to ground or to +5.00 VDC through resistor R4, depending on the position of the jumper block (not shown), as is well known in the art. Pins 2, 19, 22, 24, 26, 30, and 40 of the IDE connector J1 are connected to ground, as is well known in the art. The details of the INTRQ I/O port are discussed in the text accompanying FIG. 5I.

Referring now to FIGS. 5A to 5I, the remaining circuitry 99 of the MCA to IDE BIC 70 are shown. All devices are in electrical communication and connected as shown. The BIC 70 is implemented using level sensitive scan design (LSSD) technology, with two 22 MHz dual phase clocks (BCLK and CCLK), as is well known in the art. Numerous internal signals are generated within the other circuitry 99. The internal signals are labeled either with text labels, such as "DEC_92" (in FIG. 5A), or with parenthetic numeric labels, such as "(17-)" (in FIG. 5B), or with both text and parenthetic labels, such as "POS_105 (7)" (in FIG. 5A). Device inputs with the same labels are connected to the same signal, as is well known in the art.

Figure 5A:
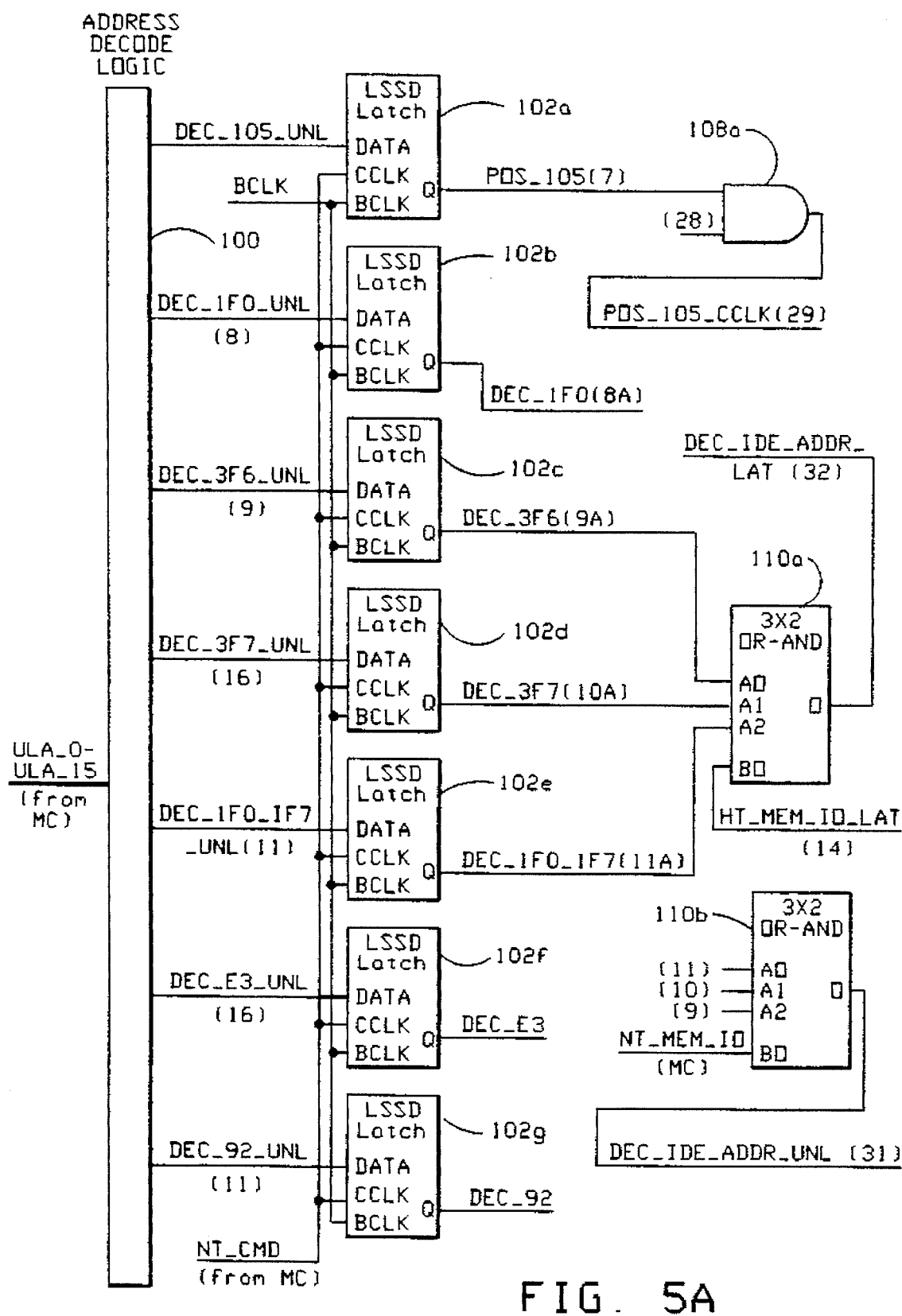
FIGS. 5A to 5I are electrical schematic diagrams showing the internal details of the MCA to IDE bus interface circuit of the present invention.

Referring now to FIG. 5A, the address decoder 100 is an address decoder as is well known in the art. The decoder 100 decodes seven I/O port address ranges: 0105H, 01F0H, 03F6H, 03F7H, 01F0H to 01F7H, 0E3H, and, 092H. The address range selects are latched with latches 102a–102g using NT_CMD as the latching input, as shown. The other devices generate respective signals, as shown.

Figure 5B:
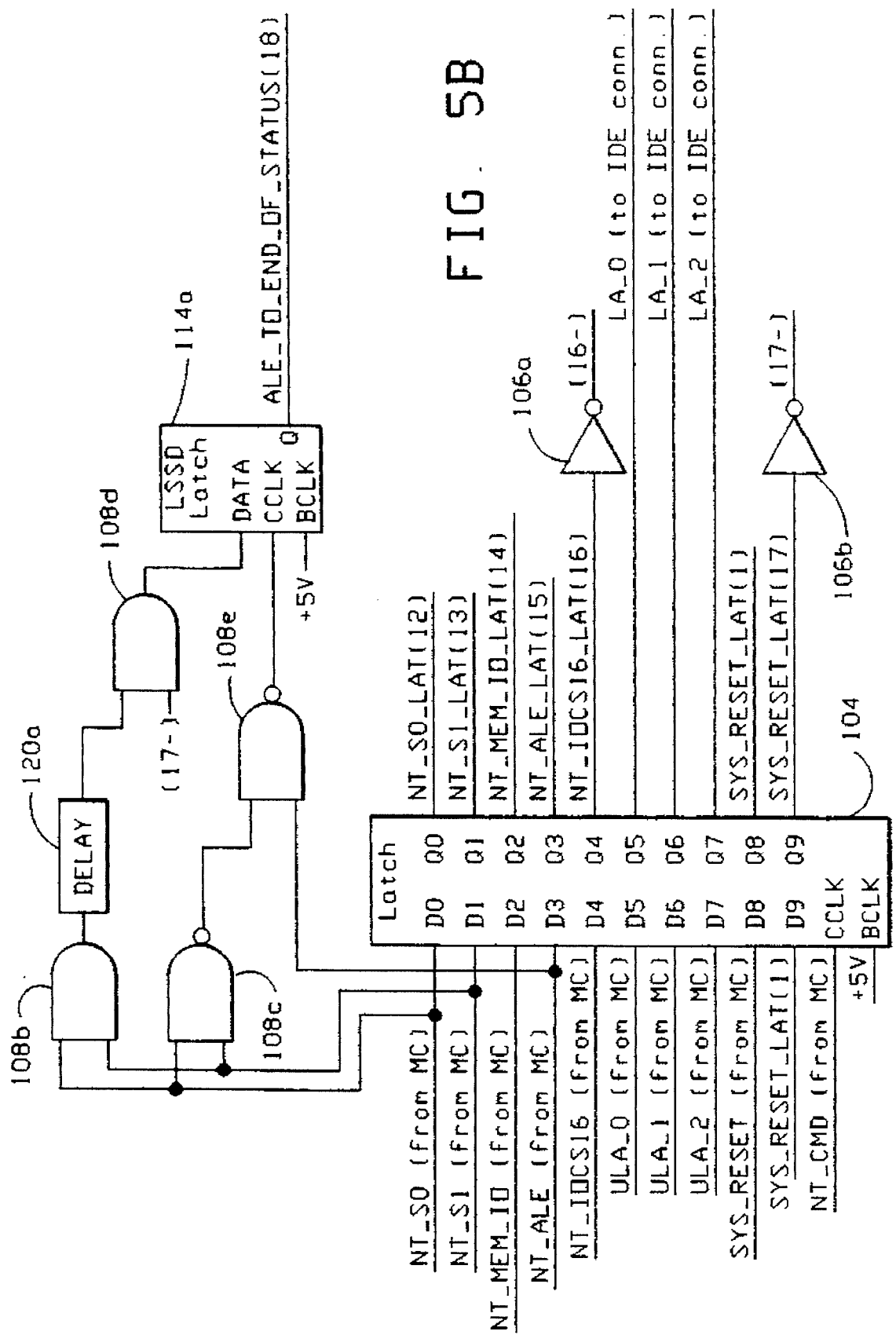

Referring now to FIG. 5B, the latch bank 104, also using NT_CMD as the latching input, latches ten inputs from the MICRO CHANNEL bus 66, as shown. The latched address lines LA_0 to LA_2 are outputs to the IDE connector J1 as shown. The DELAY 120a between the output of AND gate 108b and the input of AND gate 108d is a 20 nanosecond delay that allows correct timing for the signals in FIG. 5B, which might otherwise be problematic because both the CCLK and DATA inputs of latch 114a are generated by NT_S0 and NT_S1. The other devices generate respective signals, as shown.

Figure 5C:
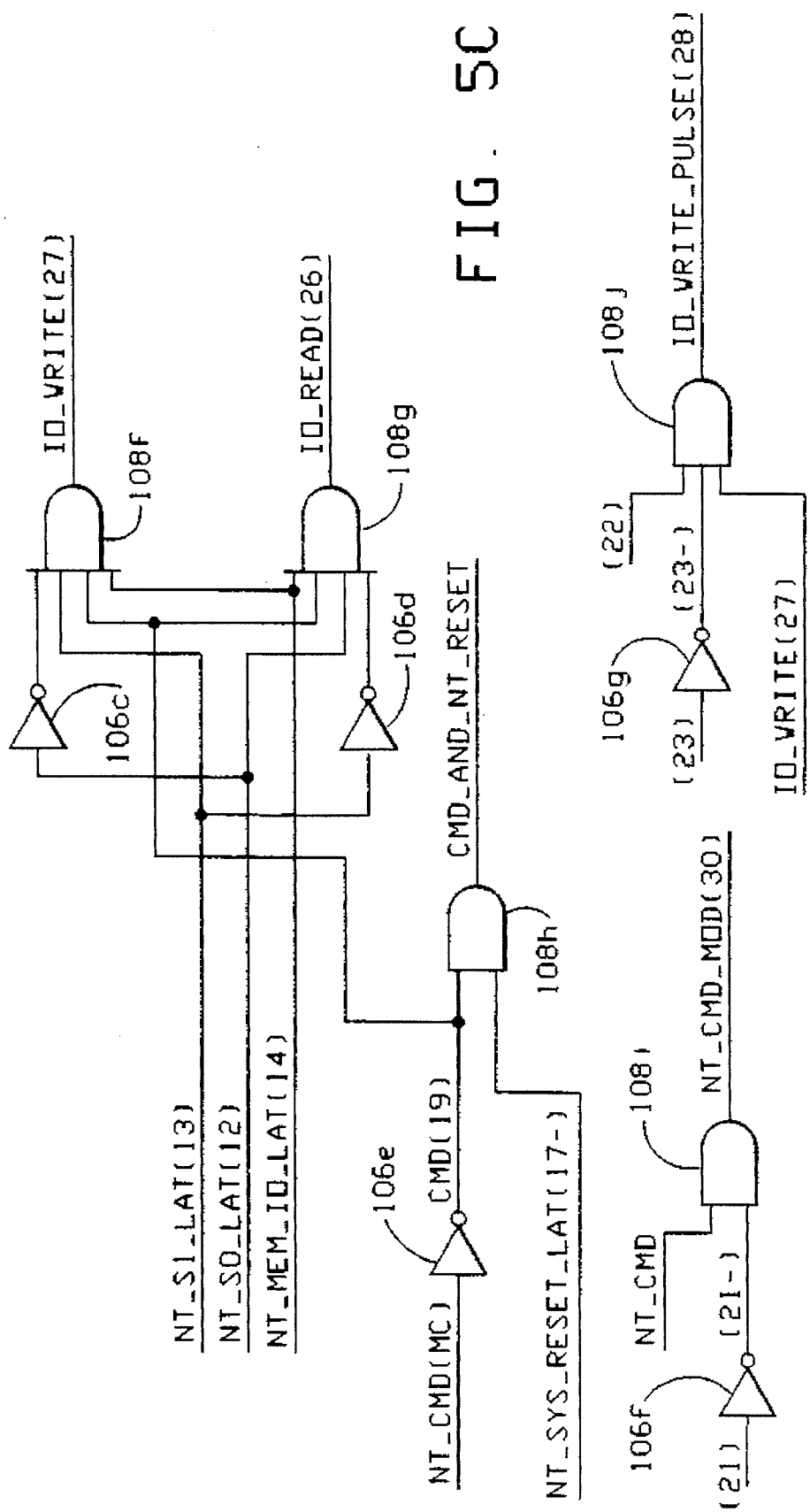

Referring now to FIG. 5C, the devices generate respective signals, as shown.

Figure 5D:
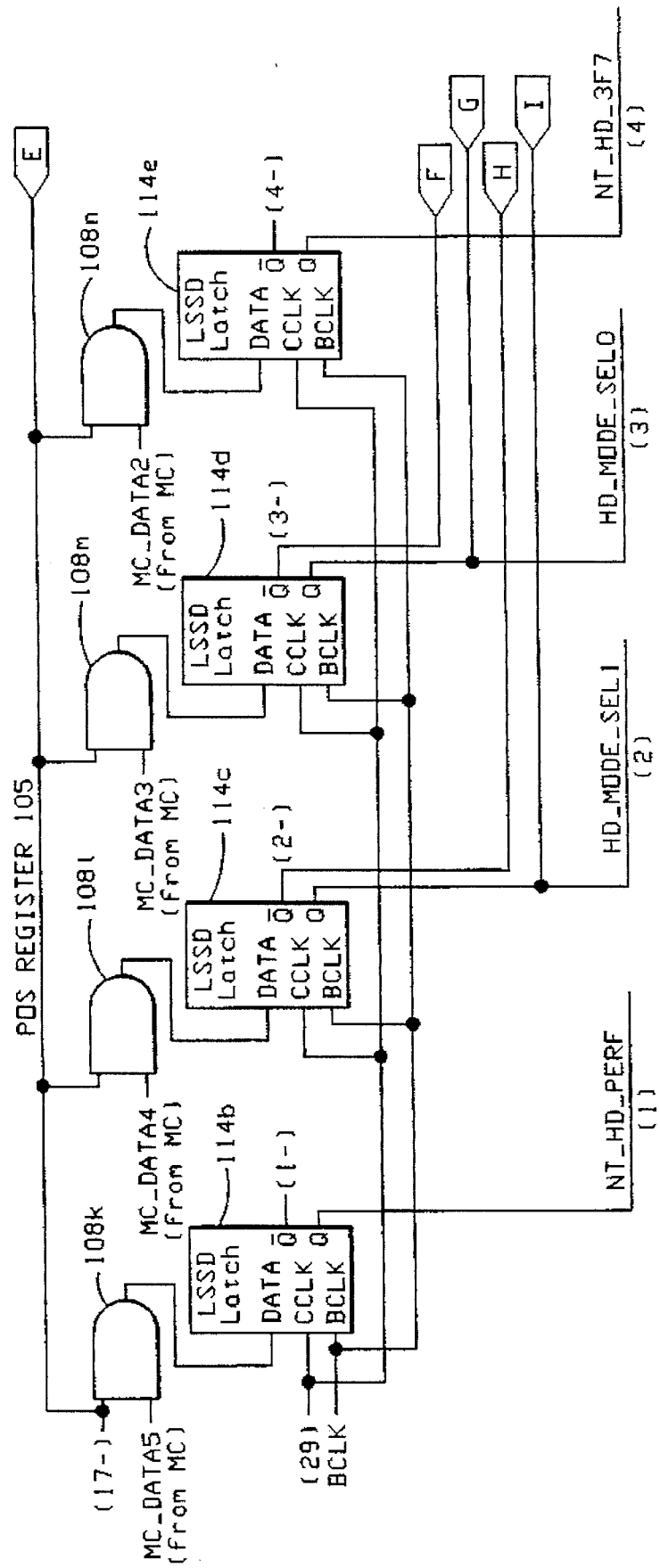
Figure 5E:
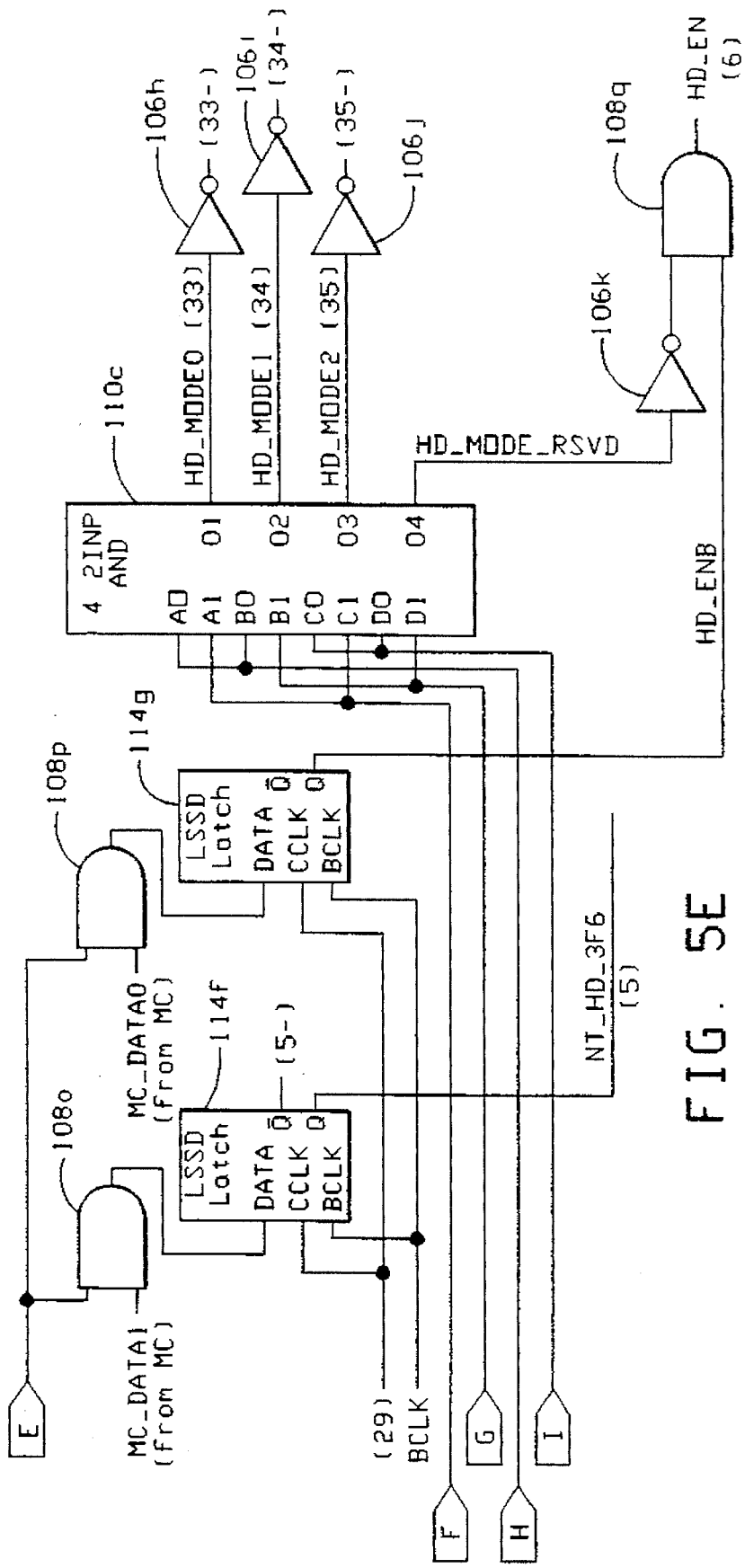

Referring now to FIGS. 5D and 5E, latches 114b–114g, as well as the other latches 102 and 114 and latch block 104, are LSSD latches, as described above. Latches 114b–114f form the writable command register at I/O address 0105H. The command register comprises six bits of command information. The first bit BIT0 of this latch enables and disables the MCA to IDE BIC 70. It must be set to a logical ONE to enable any IDE drive accesses.

The second bit BIT1 enables and disables access to I/O port address 03F6H. It must be set to a logical ONE to enable accesses to address 03F6H of the IDE device. To allow accesses to address 03F6H within the IDE drive without a conflict with the floppy drive controller 78, the floppy drive controller 78 must first be disabled.

The third bit BIT2 enables and disables access to I/O port address 03F7H. It must be set to a logical ONE to enable accesses to address 03F7H of the IDE device. To allow accesses to address 03F7H within the IDE drive without a conflict with the floppy drive controller 78, the floppy drive controller 78 must first be disabled. To enable and disable FDC accesses to 03F6H and 03F7H, the relevant enable/disable circuitry for the MCA to IDE BIC 70 shown in FIGS. 5A–5I is provided for the FDC 78 in the I/O processor 68. If both BIT1 and BIT2 are set to a one, then both ports may be accessed.

To avoid the conflict between the FDC 78 and IDE hardfile 31 over the I/O ports at addresses 03F6H and 03F7H, before accessing the ports at those addresses within the IDE drive 31, the software must disable FDC 78 access to the address(es), enable IDE drive access to the address(es), access the address(es), disable IDE drive access to the address(es), and finally enable FDC 78 access to the address(es). Note that in a multi-tasking operating system such as OS/2 it may not be desirable to disable the floppy drive 27 while accessing the IDE drive. Thus, the above procedure only has to be followed strictly for IDE accesses to 03F7H and not to 03F6H.

The fourth and fifth bits BIT3 and BIT4 are programmed based on the mode (Mode 0, Mode 1, and Mode 2, as explained above) of the IDE hard drive 31. BIT3 and BIT4 control the internal timing within the BIC 70 and are set as follows:

| Mode | BIT4 | BIT3 |
| --- | --- | --- |
| Mode 0 | 0 | 0 |
| Mode 1 | 0 | 1 |
| Mode 2 | 1 | 0 |
| Rsv'd | 1 | 1 |

The mode for a given IDE hard drive 31 attached to the system 10 may be determined using the IDENTIFY DRIVE command and reading bits 8–15 of word 51, as is well known in the art. If both BIT3 and BIT4 are set to a logical ONE, then the BIC 70 will not access the IDE hard drive 31 because HD_EN (6) will not be active; thus, this mode is reserved for future uses. In Mode 0 and Mode 1 transfers to and from the IDE drive 31 will occur, but with a loss in efficiency.

The sixth bit BIT5 performs two functions. First, BIT5 allows transfers to and from the IDE drive 31 to be very efficient. Second, if the IDE drive 31 in the system is not capable of higher performance, setting BIT5 to a logical ONE allows the disk drive to operate in a default, lower performance mode. The minimum cycle times for the various modes for both 8- and 16-bit transfers are as follows:

| | BIT5 = 0 | | BIT5 = 1 | |
| --- | --- | --- | --- | --- |
| Mode | 8-bit | 16-bit | 8-bit | 16-bit |
| Mode 0 | N/A | N/A | 750 | 390 |

|        | BIT5 = 0 |        | BIT5 = 1 |        |
|--------|----------|--------|----------|--------|
| Mode   | 8-bit    | 16-bit | 8-bit    | 16-bit |
| Mode 1 | 390      | 390    | 750      | 390    |
| Mode 2 | 300      | 300    | 660      | 300    |

Note that in this implementation, when BIT5 is set to a logical ZERO, Mode 0 transfers are not supported.

When BIT5 is set to a logical ZERO, transfer times are their shortest. Setting BIT5 to a logical ONE ensures that all cycle times will be met in IDE drives that cannot meet the faster transfer times.

Referring again to FIG. 5D and 5E, the other devices generate respective signals, as shown.

Figure 5F:
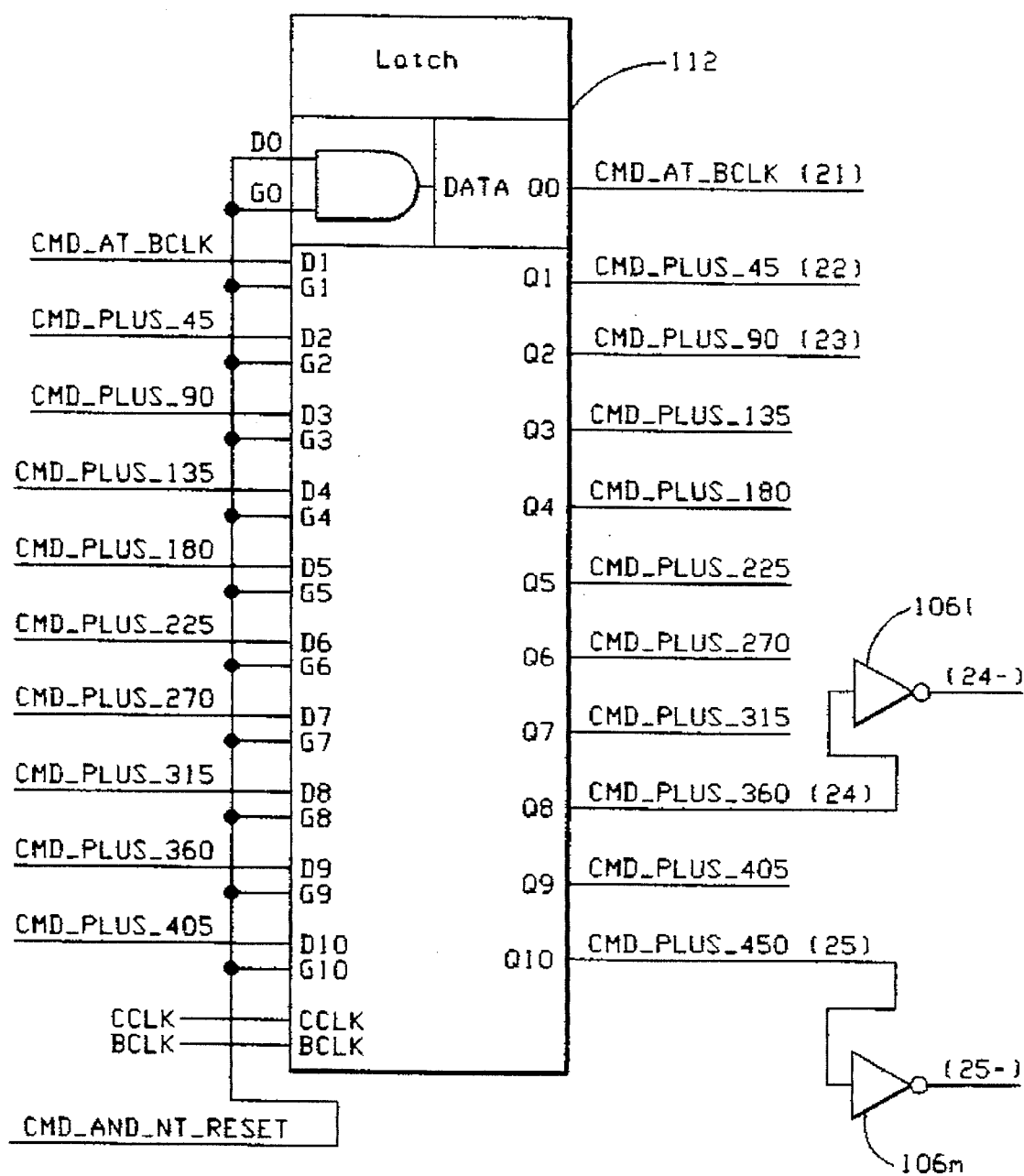

Referring now to FIG. 5F, the latch block 112 generates timing commands for the BIC 70. Each latch within the latch block 112 has two inputs: "D" and "G." These inputs are ANDed together and the output of the AND gate becomes the input to the latch, which is clocked into the latch by CCLK. CCLK is one of the 22 MHz LSSD dual phase clocks, described above. In the alternative, CCLK may be any 22 MHz free-running clock with a 60/40 duty cycle. As shown, each latch within the latch block 112 has as inputs the output of the preceding latch and CCLK (ANDed together), with the exception of the first latch, which has CCLK as for both of its inputs (ANDed together). For example, CMD_AT_BCLK, which is the output of Q0, is the input D1. As shown, most of the outputs are wrapped back around to the input of the next latch, thereby providing timing signals to the BIC. The other devices generate respective signals, as shown.

Figure 5G:
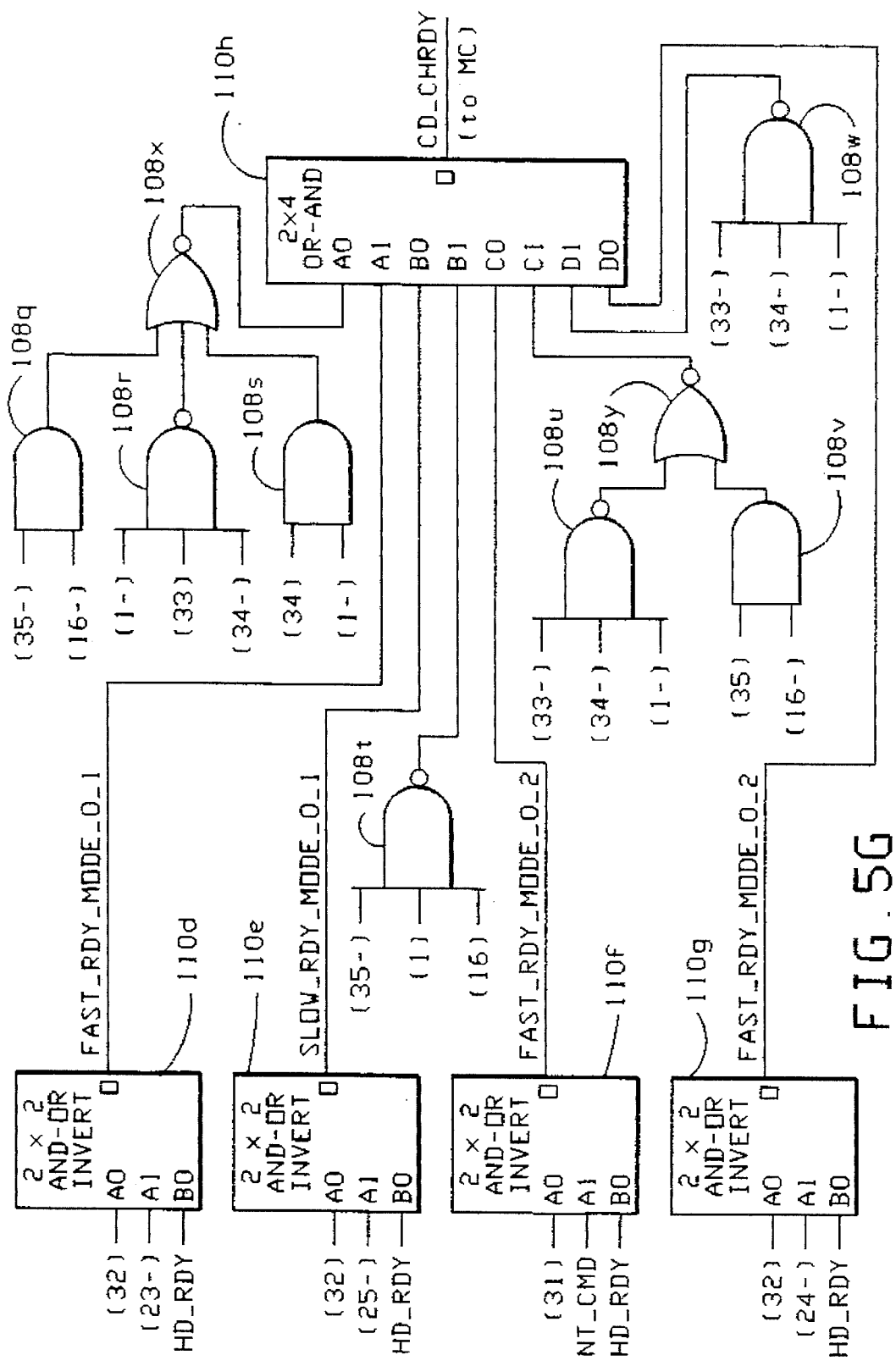

Referring now to FIGS. 5G, the details of the MICRO CHANNEL bus line CD CHRDY generator are shown. As shown, the devices generate their respective signals, culminating in CD CHRDY, which is output to the MICRO CHANNEL bus.

Figure 5H:
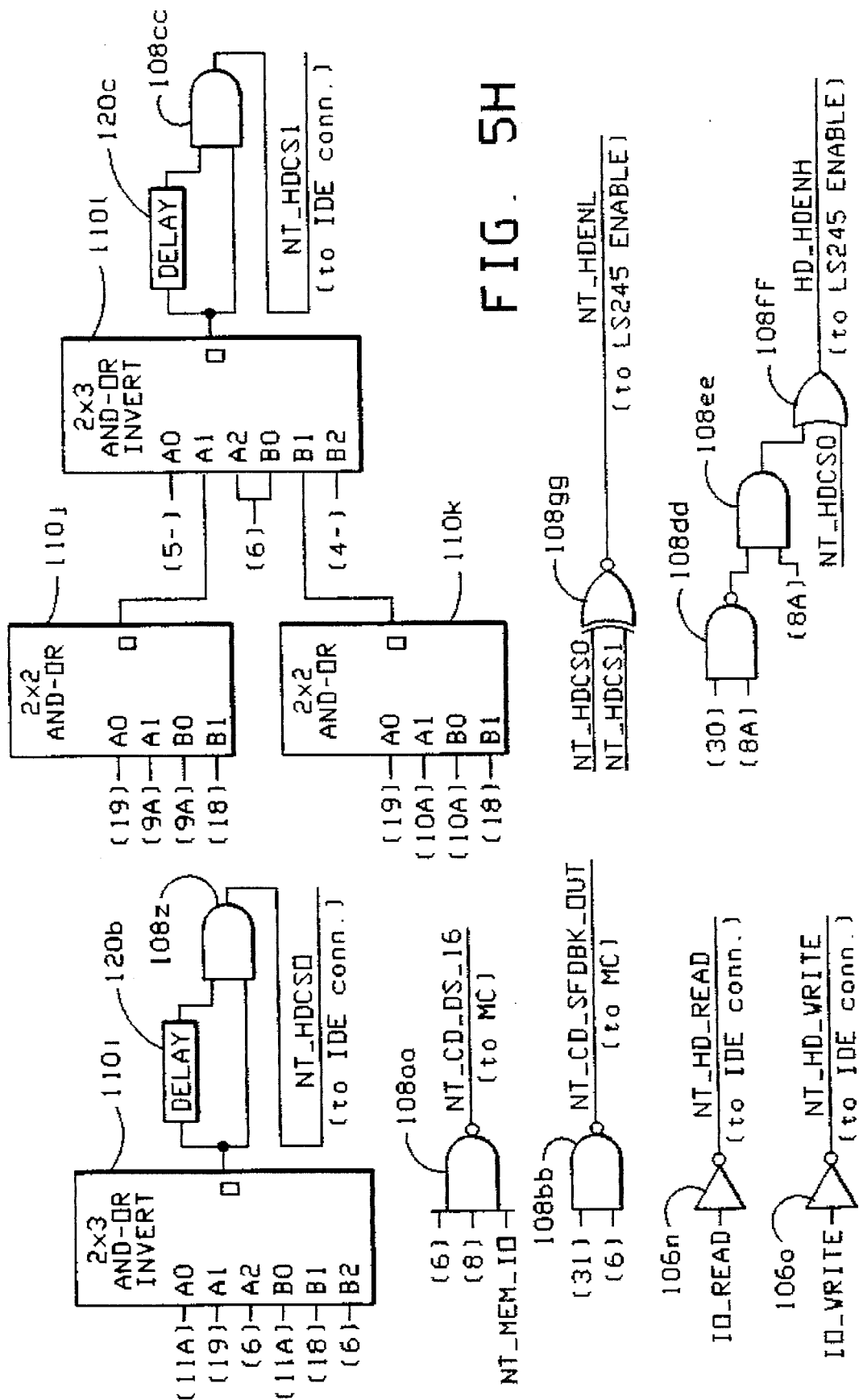

Referring now to FIG. 5H, the devices within the MCA to IDE BIC 70 generate their respective signals, as shown, culminating in several signals that are output to the MICRO CHANNEL bus 66, the IDE interface 86, and the data buffers 72. The DELAY 120b between complex logic block 110i and AND gate 108z is 20 nanoseconds long and extends NT_HDCS0 by an additional 20 nanoseconds in an active low state to meet the IDE chip select hold time specification. The DELAY 102c between complex logic gate 110l and AND gate 108cc is 20 nanoseconds long and serves the purpose of extending NT_HDCS1 by an additional 20 nanoseconds in an active low state to meet the IDE chip select hold time specification.

Figure 5I:
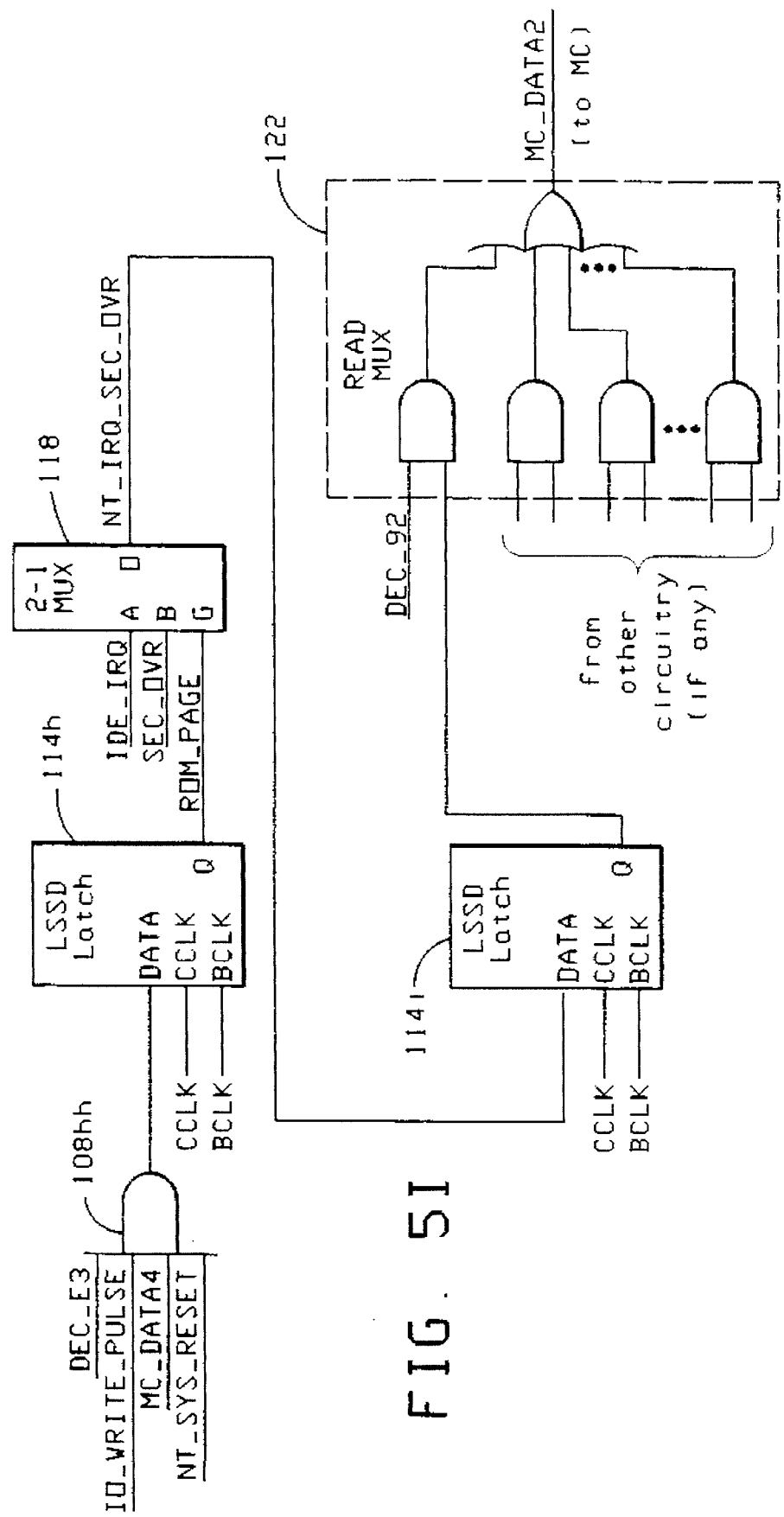

Referring now to FIG. 5I, the details of the INTRQ I/O port are shown. As noted above, to share INTRQ with —IRQ 14, the IDE interface line INTRQ is interfaced to —IRQ 14 with the tristate buffer 116, as shown in FIG. 4A. As mentioned above, INTRQ is further connected to the system via an I/O port; the —INT 14 interrupt service routine determines if INTRQ generated the —INT 14 interrupt by reading that I/O port. As shown in FIG. 5I, as implemented, the interrupt I/O port is bit 2 of the I/O port at address 092H, the same I/O port as the security override feature.

The security override bit indicates to the system BIOS whether to require a password to enter the system (normal usage) or to allow entry into the system without the password. This feature is typically used by service repair personnel performing system maintenance or repair. As shown in FIG. 4B the security override SEC_OVR feature is implemented with a two position jumper JP1 that connects the security I/O port either to ground or to +5.00 VDC through resistor R4, depending on the position of the jumper block (not shown).

INTRQ and security override share bit 2 of I/O port 092H using a multiplexer 118 controlled by bit 4 of I/O port 0E3H. The security override bit is only checked once when the system first boots. Thereafter, the bit may be used by the —IRQ 14 interrupt service routine to determine if INTRQ caused the —IRQ 14 interrupt. Thus, at system power up, bit 4 of I/O port 0E3H is set such that the security override bit is accessed by bit 2 of I/O port 092H. After the security override bit is read, bit 4 of I/O port 0E3H is set such that INTRQ is accessed by accessing bit 2 of I/O port 092H. The data is passed through the read multiplexer 122, as is well known in the art. The output of the read multiplexer 122 is a tristate output that is either a logic ZERO or ONE when the MCA to IDE BIC 70 is being accessed and high-impedance when the MCA to IDE BIC 70 is not being accessed.

The MCA to IDE BIC 70 does not support IDE direct memory access (DMA) cycles, but could be modified to interface IDE DMA cycles to the MICRO CHANNEL bus.

Using the MCA to IDE BIC of the present invention is very straightforward. With respect to the IDE hardfile, addresses 03F6H and 03F7H are accessed only to accomplish system-type tasks such as generating a "soft" reset of the IDE drive, or enabling or disabling the hardfile interrupt, or reading the status of the hardfile without clearing a pending interrupt, or for reading diagnostic information from the hardfile. As such, they are accessed seldomly. Moreover, typically, only the system BIOS accesses the diagnostic features of the hard drive. Thus, as long as the system BIOS is modified to make use of the command latch when accessing the diagnostic addresses, the IDE interface may be used with the floppy drive controller 78.

Specifically, with respect to the IDE, address 03F6H is written to only generate a "soft" reset of the IDE drive within the IDE drive or to enable or disable the drive interrupt. Reading the 03F6H register yields the same information as a read of the Status Register, which is located at address 01F7H, except that reading the 03F6H register does not cause a pending interrupt to be cleared, as a read of address 01F7H does. Thus, software accesses to address 03F6H in an IDE drive are minimal. The read-only register at address 03F7H is used only for diagnostic purposes and, therefore, is accessed even less than the register at 03F6H. Because the 03F6H port of the floppy drive 27 is currently reserved (not used), the FDC does not respond to accesses to 03F6H. Thus, the IDE 03F6H enable bit in the aforementioned FDC command latch is really more of an extra safeguard in case that future FDCs use the 03F6H address. Thus, unlike IDE address 03F7H, which must be enabled and disabled to avoid a conflict with FDC address 03F7H, accesses to IDE address 03F6H can safely be made without disabling the FDC address 03F6H. Clearly, if future FDCs use 03F6H, then the FDC address 03F6H would have to be disabled before an IDE address 03F6H access is made.

For normal operation, the FDC 78 has access to the I/O port at address 03F7H. Thus, FDC accesses to that address must be enabled. Any software directly accessing address 03F7H of the IDE hardfile 31 should disable FDC accesses to that address, enable IDE accesses to that address, access IDE address 03F7H, disable IDE accesses to address 03F7H, and finally enable FDC accesses to that address.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. For example, the I/O processor 68, the MCA to IDE BIC 70, and the data buffers 72 can all be implemented in a single logic device. Therefore, the invention in its broader aspects is not limited to the specific details, representative apparatus and method, and illustrative examples shown and described. Accordingly, departures may be made from such details without departing from the spirit or scope of the applicant's general inventive concept.

I claim:

1. A computer system comprising:
   (a) a central processing unit (CPU);
   (b) a first bus interface circuit in circuit communication with said CPU and generating a first peripheral bus, said first peripheral bus having at least one sharable hardware interrupt, said sharable interrupt having at least two states: assertion and nonassertion;
   (c) a second bus interface circuit in circuit communication with said first bus interface circuit via said first peripheral bus and generating a second peripheral bus, said second peripheral bus having at least one nonsharable hardware interrupt, said nonsharable interrupt having at least two states: assertion and nonassertion;
   (d) a first peripheral device in circuit communication with said first bus interface circuit via said first peripheral bus and having a first address space associated therewith; and
   (e) a second peripheral device in circuit communication with said second bus interface circuit via said second peripheral bus and having a second address space associated therewith, said first and second peripheral devices having at least one overlapping address in said first and second address spaces;
   said second bus interface circuit characterized by having: (1) a writable latch in circuit communication with said first peripheral bus and having at least two states, said latch states selectable from said first peripheral bus; (2) an access control circuit in circuit communication with said first and second peripheral buses and said latch for selectively allowing data transfers at said at least one overlapping address either between said CPU and said first peripheral device or between said CPU and said second peripheral device responsive to the state of said latch; (3) circuitry for assertion of said sharable interrupt of said first peripheral bus responsive to the assertion of said nonsharable interrupt of said second peripheral bus; and (4) circuitry for nonassertion of said sharable interrupt of said first peripheral bus responsive to the nonassertion of said nonsharable interrupt of said second peripheral bus.

2. The computer system according to claim 1 further characterized by said first peripheral bus having first and second bus lines for extending the length of time of data transfers along said first peripheral bus, said first peripheral bus data transfers being extended by asserting said first bus line of said first peripheral bus before said second bus line of said first peripheral bus is asserted; said second peripheral bus also having first and second bus lines for extending the length of time of data transfers along said second peripheral bus, said second peripheral bus data transfers being extended by asserting said first bus line of said second peripheral bus after said second bus line of said second peripheral bus is asserted; and said second bus interface circuit further comprising circuitry for reversing the order of assertion of said first bus lines of said first and second peripheral buses with respect to the assertion of said second bus lines of said first and second peripheral buses.

3. A computer system comprising:
   (a) a central processing unit (CPU);
   (b) a first bus interface circuit in circuit communication with said CPU and generating a first peripheral bus for transferring data and substantially conforming to the bus described in "IBM Personal System/2 Hardware Interface Technical Reference" and having a sharable interrupt, said sharable interrupt having at least two states: assertion and nonassertion; and
   (c) a second bus interface circuit in circuit communication with said first bus interface circuit and generating a second peripheral bus for transferring data and substantially conforming to the bus described in draft American National Standards Institute (ANSI) specification number X3.221 entitled "AT Attachment Interface for Hard Drives" and having a nonsharable interrupt, said nonsharable interrupt having at least two states: assertion and nonassertion;
   said second bus interface circuit comprising: (1) circuitry for transferring data between said first and second peripheral buses; (2) circuitry for assertion of said sharable interrupt of said first peripheral bus responsive to the assertion of said nonsharable interrupt of said second peripheral bus; and (3) circuitry for the nonassertion of said sharable interrupt of said first peripheral bus responsive to the nonassertion of said nonsharable interrupt of said second peripheral bus.

4. A computer system comprising:
   (a) a central processing unit having a local bus associated therewith;
   (b) a first peripheral bus for transferring data and substantially conforming to the bus described in "IBM Personal System/2Hardware Interface Technical Reference," said first peripheral bus having a sharable interrupt, said sharable interrupt having at least two states: assertion and nonassertion;
   (c) a first bus interface circuit in circuit communication with said local bus, in circuit communication with said first peripheral bus, and electrically interfacing between said local bus and said first peripheral bus;
   (d) a second peripheral bus for transferring data and substantially conforming to the bus described in draft American National Standards Institute (ANSI) specification number X3.221 entitled "AT Attachment Interface for Hard Drives," said second peripheral bus having a nonsharable interrupts said nonsharable interrupt having at least two states: assertion and nonassertion; and
   (e) a second bus interface circuit in circuit communication with said first peripheral bus, in circuit communication with said second peripheral bus, and electrically interfacing between said first and second peripheral buses;
   said second bus interface circuit comprising: (1) circuitry for transferring data between said first and second peripheral buses; (2) circuitry for assertion of said sharable interrupt of said first peripheral bus responsive to the assertion of said nonsharable interrupt of said second peripheral bus; and (3) circuitry for nonassertion of said sharable interrupt of said first peripheral bus responsive to the nonassertion of said nonsharable interrupt of said second peripheral bus.

5. The computer system according to either claim 4 or claim 5 said circuitry for transferring data comprising:

(a) a writable latch in circuit communication with said first peripheral bus and having at least two states, said latch states selectable from said first peripheral bus; and (b) an access control circuit in circuit communication with said first and second peripheral buses and said latch for selectively allowing data transfers between said first and second peripheral buses or blocking data transfers between said first and second peripheral buses responsive to the state of said latch.

6. The computer system according to any of claims 1, 2, 3, or 4 further comprising circuitry for reading from said first peripheral bus the state of said nonsharable interrupt of said second peripheral bus.

7. A computer system comprising:

(a) a central processing unit (CPU);

(b) a first bus interface circuit in circuit communication with said CPU and generating a first peripheral bus for transferring data, said first peripheral bus having a data transfer bus and an interrupt bus, said data transfer bus and said interrupt bus substantially conforming to the data transfer and interrupt buses described in "IBM Personal System/2 Hardware Interface Technical Reference," said interrupt bus having a sharable interrupt, said sharable interrupt having at least two states: assertion and nonassertion; and (c) a second bus interface circuit in circuit communication with said first bus interface circuit and generating a second peripheral bus for transferring data and substantially conforming to the bus described in draft American National Standards Institute (ANSI) specification number X3.221 entitled "AT Attachment Interface for Hard Drives" having a nonsharable interrupt, said nonsharable interrupt having at least two states: assertion and nonassertion;

said second bus interface circuit comprising: (1) circuitry for transferring data between said first and second peripheral buses; (2) circuitry for assertion of said sharable interrupt of said first peripheral bus responsive to the assertion of said nonsharable interrupt of said second peripheral bus; and (3) circuitry for the nonassertion of said sharable interrupt of said first peripheral bus responsive to the nonassertion of said nonsharable interrupt of said second peripheral bus.

8. A computer system comprising:

(a) a central processing unit having a local bus associated therewith;

(b) a first peripheral bus for transferring data, said first peripheral bus having a data transfer bus and an interrupt bus, said data transfer bus and said interrupt bus substantially conforming to the data transfer and interrupt buses described in "IBM Personal System/2 Hardware Interface Technical Reference," said interrupt bus having a sharable interrupt, said sharable interrupt having at least two states: assertion and nonassertion;

(c) a first bus interface circuit in circuit communication with said local bus, in circuit communication with said first peripheral bus, and electrically interfacing between said local bus and said first peripheral bus;

(d) a second peripheral bus for transferring data and substantially conforming to the bus described in draft American National Standards Institute (ANSI) specification number X3.221 entitled "AT Attachment Interface for Hard Drives," said second peripheral bus having a nonsharable interrupt, said nonsharable interrupt having at least two states: assertion and nonassertion; and (e) a second bus interface circuit in circuit communication with said first peripheral bus, in circuit communication with said second peripheral bus, and electrically interfacing between said first and second peripheral buses;

said second bus interface circuit comprising: (1) circuitry for transferring data between said first and second peripheral buses; (2) circuitry for assertion of said sharable interrupt of said first peripheral bus responsive to the assertion of said nonsharable interrupt of said second peripheral bus; and (3) circuitry for nonassertion of said sharable interrupt of said first peripheral bus responsive to the nonassertion of said nonsharable interrupt of said second peripheral bus.

9. A computer system comprising:

(a) a central processing unit (CPU);

(b) a first bus interface circuit in circuit communication with said CPU and generating a first peripheral bus for transferring data and substantially conforming to the bus described in "IBM Personal System/2 Hardware Interface Technical Reference" having a sharable interrupt, said sharable interrupt having at least two states: assertion and nonassertion; and (c) a second bus interface circuit in circuit communication with said first bus interface circuit and generating a second peripheral bus for transferring data, said second peripheral bus having a data transfer bus and an interrupt bus, said data transfer bus and said interrupt bus substantially conforming to the data transfer and interrupt buses described in draft American National Standards Institute (ANSI) specification number X3.221 entitled "AT Attachment Interface for Hard Drives," said interrupt bus having a nonsharable interrupt, said nonsharable interrupt having at least two states: assertion and nonassertion;

said second bus interface circuit comprising: (1) circuitry for transferring data between said first and second peripheral buses; (2) circuitry for assertion of said sharable interrupt of said first peripheral bus responsive to the assertion of said nonsharable interrupt of said second peripheral bus; and (3) circuitry for the nonassertion of said sharable interrupt of said first peripheral bus responsive to the nonassertion of said nonsharable interrupt of said second peripheral bus.

10. A computer system comprising:

(a) a central processing unit having a local bus associated therewith;

(b) a first peripheral bus for transferring data and substantially conforming to the bus described in "IBM Personal System/2 Hardware Interface Technical Reference," said first peripheral bus having a sharable interrupt, said sharable interrupt having at least two states: assertion and nonassertion;

(c) a first bus interface circuit in circuit communication with said local bus, in circuit communication with said first peripheral bus, and electrically interfacing between said local bus and said first peripheral bus;

(d) a second peripheral bus for transferring data, said second peripheral bus having a data transfer bus and an interrupt bus, said data transfer bus and said interrupt bus substantially conforming to the data transfer and interrupt buses described in draft American National Standards Institute (ANSI) specification number X3.221 entitled "AT Attachment Interface for Hard Drives," said interrupt bus having a nonsharable interrupt, said nonsharable interrupt having at least two states: assertion and nonassertion; and (e) a second bus interface circuit in circuit communication with said first peripheral bus, in circuit communication with said second peripheral bus, and electrically interfacing between said first and second peripheral buses;

said second bus interface circuit comprising: (1) circuitry for transferring data between said first and second peripheral buses; (2) circuitry for assertion of said sharable interrupt of said first peripheral bus responsive to the assertion of said nonsharable interrupt of said second peripheral bus; and (3) circuitry for nonassertion of said sharable interrupt of said first peripheral bus responsive to the nonassertion of said nonsharable interrupt of said second peripheral bus.

11. The computer system according to any of claims 9–10, said circuitry for transferring data comprising:

(a) a writable latch in circuit communication with said first peripheral bus and having at least two states, said latch states selectable from said first peripheral bus; and (b) an access control circuit in circuit communication with said first and second peripheral buses and said latch for selectively allowing data transfers between said first and second peripheral buses or blocking data transfers between said first and second peripheral buses responsive to the state of said latch.

12. The computer system according to any of claims 7–10 further comprising circuitry for reading from said first peripheral bus the state of said nonsharable interrupt of said second peripheral bus.

13. The computer system according to claim 5 further comprising circuitry for reading from said first peripheral bus the state of said nonsharable interrupt of said second peripheral bus.

14. The computer system according to claim 12 further comprising circuitry for reading from said first peripheral bus the state of said nonsharable interrupt of said second peripheral bus.

15. A computer system comprising:

(a) a central processing unit (CPU);

(b) a first bus interface circuit in circuit communication with said CPU and generating a first peripheral bus for transferring data, said first peripheral bus having a data transfer bus and an interrupt bus, said data transfer bus and said interrupt bus substantially conforming to the data transfer and interrupt buses described in "IBM Personal System/2 Hardware Interface Technical Reference," said interrupt bus having a sharable interrupt, said sharable interrupt having at least two states: assertion and nonassertion; and (c) a second bus interface circuit in circuit communication with said first bus interface circuit and generating a second peripheral bus for transferring data, said second peripheral bus having a data transfer bus and an interrupt bus, said data transfer bus and said interrupt bus substantially conforming to the data transfer and interrupt buses described in draft American National Standards Institute (ANSI) specification number X3.221 entitled "AT Attachment Interface for Hard Drives," said interrupt bus having a nonsharable interrupt, said nonsharable interrupt having at least two states: assertion and nonassertion;

said second bus interface circuit comprising: (1) circuitry for transferring data between said first and second peripheral buses; (2) circuitry for assertion of said sharable interrupt of said first peripheral bus responsive to the assertion of said nonsharable interrupt of said second peripheral bus; and (3) circuitry for the nonassertion of said sharable interrupt of said first peripheral bus responsive to the nonassertion of said nonsharable interrupt of said second peripheral bus.

16. A computer system comprising:

(a) a central processing unit having a local bus associated therewith;

(b) a first peripheral bus for transferring data, said first peripheral bus having a data transfer bus and an interrupt bus, said data transfer bus and said interrupt bus substantially conforming to the data transfer and interrupt buses described in "IBM Personal System/2 Hardware Interface Technical Reference," said interrupt bus having a sharable interrupt, said sharable interrupt having at least two states: assertion and nonassertion;

(c) a first bus interface circuit in circuit communication with said local bus, in circuit communication with said first peripheral bus, and electrically interfacing between said local bus and said first peripheral bus;

(d) a second peripheral bus for transferring data, said second peripheral bus having a data transfer bus and an interrupt bus, said data transfer bus and said interrupt bus substantially conforming to the data transfer and interrupt buses described in draft American National Standards Institute (ANSI) specification number X3.221 entitled "AT Attachment Interface for Hard Drives," said interrupt bus having a nonsharable interrupt, said nonsharable interrupt having at least two states: assertion and nonassertion; and (e) a second bus interface circuit in circuit communication with said first peripheral bus, in circuit communication with said second peripheral bus, and electrically interfacing between said first and second peripheral buses;

said second bus interface circuit comprising: (1) circuitry for transferring data between said first and second peripheral buses; (2) circuitry for assertion of said sharable interrupt of said first peripheral bus responsive to the assertion of said nonsharable interrupt of said second peripheral bus; and (3) circuitry for nonassertion of said sharable interrupt of said first peripheral bus responsive to the nonassertion of said nonsharable interrupt of said second peripheral bus.

* * * * *